United States Patent Office 3,351,768
Patented Nov. 7, 1967

3,351,768
APPARATUS FOR DETECTING AND INDICATING
THE EXTENT OF RELATIVE MOVEMENT
Conrad Reginald Cooke, 1 Court Drive,
Shillingford, England
Filed June 15, 1964, Ser. No. 375,262
Claims priority, application Great Britain, June 21, 1963,
24,873/63
15 Claims. (Cl. 250—237)

ABSTRACT OF THE DISCLOSURE

Apparatus responsive to relative movement between two relatively movable members comprising a reference source providing an alternating current signal, a pair of gratings mounted respectively in fixed relation to said relatively movable members, said gratings being superposed in close proximity for producing a cyclic pattern of interference fringes in a flux field, means defining a plurality of elemental areas of the fringe pattern which areas are relatively displaced in phase with respect to the fringe pattern, detector means responsive to the fringes and positioned with respect to said areas for producing an alternating current signal having components each of whose amplitudes is a function of the flux across a respective elemental area of the fringe pattern, a phase shift network having input terminals and output terminals and including a number of phase-shifting elements corresponding to the number of said elemental areas, said input terminals being connected to the detector means and said output terminals being connected to an output circuit for deriving an output signal which is phase-displaced relatively to said reference signal by an amount proportional to the displacement of the fringes from a reference position, and means for comparing the output signal with the reference signal.

---

This invention relates to apparatus for detecting and indicating the extent and/or speed of relative movement between two relatively movable members, such as the tool carriage and a slide in a machine tool for example, or for initiating a control operation in dependence upon such relative movement. The invention is particularly concerned with apparatus of the kind described in U.S. Patent No. 3,230,380, dated Jan. 18, 1966, comprising a pair of relatively movable superimposed gratings which are arranged to produce a pattern of interference fringes and detector means constituting a spatial frame of reference and producing a polyphase output signal which is phase-displaced with respect to a datum or reference signal by a phase angle proportional to the displacement of the fringes from a reference position.

In one form of apparatus described in the above patent, three light sources are energised by different phases of a polyphase electrical supply and light from the sources passes through two gratings mounted on the relatively movable members and on to an array of photoelectric cells, the output signals from which are combined to produce a polyphase signal which is displaced in phase relatively to the electric supply by an angle proportional to any displacement of the fringes, and hence to the extent of any relative movement between the relatively movable members; the phase displacement is converted to a mechanical movement by connecting the stator and rotor windings of a polyphase dynamoelectric machine to the supply and to the polyphase output of the photoelectric cells respectively. In an alternative form of apparatus magnetic gratings instead of optical gratings are used to produce magnetic interference fringes and the fringe displacement is detected by means of flux gates energised by different phases of a polyphase supply, the output signals from the flux gates being combined to produce a polyphase signal which is phase-displaced relative to the supply, as in the optical arrangement.

The modified apparatus according to the present invention comprises a reference source providing an alternating current signal, a pair of gratings mounted respectively in fixed relation to said relatively movable members, said gratings being superposed in close proximity for producing a cyclic pattern of interference fringes in a flux field, means defining a plurality of elemental areas of the fringe pattern which areas are relatively displaced in phase with respect to the fringe pattern, detector means responsive to the fringes and positioned with respect to said areas for producing an alternating current signal having components each of whose amplitudes is a function of the flux across a respective elemental area of the fringe pattern, a phase-shift network having input terminals and output terminals and including a number of phase-shifting elements corresponding to the number of said elemental areas, said input terminals being connected to the detector means and said output terminals being connected to an output circuit for deriving an output signal which is phase displaced relatively to said reference signal by an amount proportional to the displacement of the fringes from a reference position, and means for comparing the output signal with the reference signal.

In one arrangement the detector means comprise an array of detectors constituting a spatial frame of reference and energised from a single phase supply and the in-phase output signals of the detectors are applied to different points of a phase-shifting network, or phase converter, so as to produce a combined output signal which is displaced in phase relatively to the supply by a phase angle proportional to the displacement of the fringes from a reference position.

The invention has general application and may, in principle, be applied to the magnetic arrangement referred to above. In this case the flux gates would be energised from a common single phase supply and the output signals from the flux gates would be applied to the different points of the phase-shifting network so as to produce a phase-modulated combined signal. The advantages of the invention are greatest, however, in the case of an optical system since this enables a single light source to be used and hence avoids any disadvantages which might arise in a system using a plurality of light sources the light outputs from which might vary relatively to one another due to aging of one or more of the sources.

One optical arrangement according to the invention comprises a light source energised from a single phase supply, a pair of superposed gratings illuminated by the light source and producing interference fringes the displacement of which from a datum position is proportional to any relative displacement of the gratings, and a plurality of photoelectric cells positioned to detect the fringes, the cells being distributed over a distance of one fringe cycle, the output signals from the photoelectric cells being applied to different points of a phase-shifting network for producing an output signal which is displaced in phase relatively to the supply by an amount proportional to the displacement of the fringes.

It is to be understood that the term "light source" as used in this specification is not limited to means for producing visible light but is applicable to any source of electromagnetic radiation which can be detected photoelectrically, including infra-red and ultra-violet radiation. One suitable light source, for example, is the gallium arsenide cell which produces infra-red radiation which can be modulated at frequencies up to about $10^7$ c./s.

Various embodiments of the invention will now be described by way of example with reference to the accompanying drawings, in which.

Figure 1:
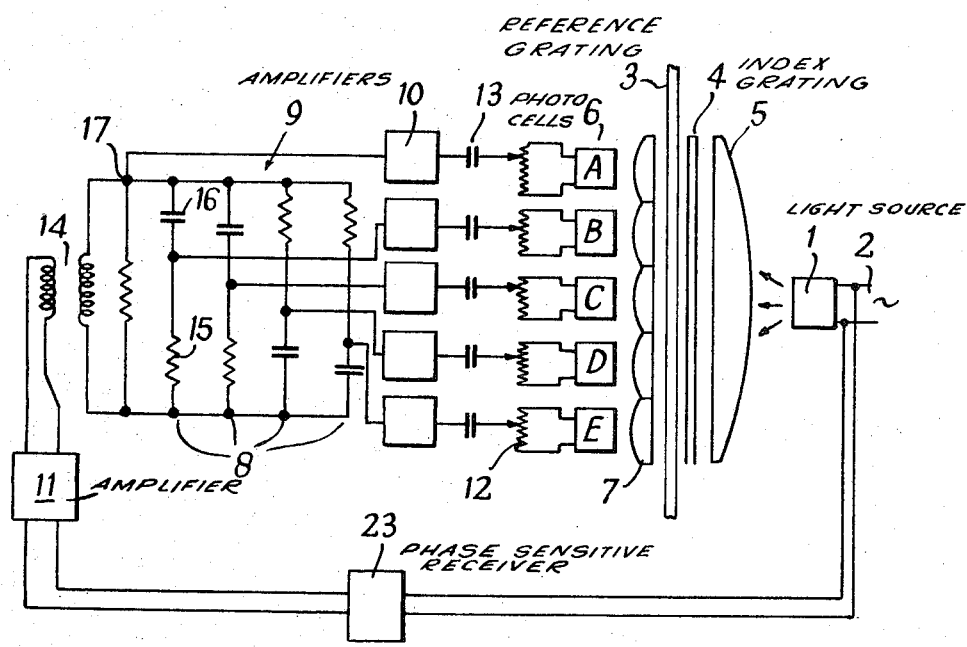
FIGURE 1 illustrates schematically the lay-out of one form of apparatus using a single light source and a number of photoelectric cells.

Referring to FIGURE 1, a light source 1, which may be a gallium arsenide cell, is energised by a single phase 400 c./s. supply 2 so as to produce light fluctuating at 400 cycles per second. Two optical gratings, namely a reference grating 3 and a superposed index grating 4, are mounted respectively in fixed relation to the two members whose relative movement is to be measured. These gratings are illuminated by light from the source 1 passing through a collimator 5, so as to produce a cyclic pattern of interference fringes, the positions of which are dependent upon the relative positions of the gratings and hence of the relatively movable members. The fringes are detected by a balanced array 6 of five photoelectric cells, A, B, C, D, E, which are arranged in a line extending in the direction of measured movement as shown by the arrows 20 in FIGURE 2. The light is concentrated onto the cells from each of five elemental rectangular areas of the fringe pattern, by means of a set of equally spaced collimating lenses 7, which form a spatial frame of reference in the form of a window.

Each cell receives light from the source 1 via a respective elemental area and the total amount of light falling on the cells will remain substantially constant irrespective of the position of the fringe pattern relative to the spatial frame of reference. The relative amount of light falling on different cells, however, will vary in accordance with the position of the fringe pattern. The component outputs from the cells will have different amplitudes according to the relative amounts of light falling on the different cells and will contain alternating current components of signal which are in phase with one another and have the frequency of the light source 1.

In order to convert the fringe displacements into proportional displacements of electric phase angle, the outputs from the cells A–E are applied to different elements 8 of a phase-shift network 9 and a combined output signal is derived therefrom via a transformer 14 and amplifier 11. Amplifiers 10 may be used to amplify the outputs from the cells instead of, or as well as, having an output amplifier 11. Potentiometers 12 across the outputs of the photoelectric cells may be used to balance the relative sensitivities of the cells, and capacitors 13 may be used to eliminate direct current components of signal. Each element 8, which comprises a resistor 15 in series with a capacitor 16, is adjusted to shift the phase of the signal applied to it from a respective photoelectric cell through an angle that accurately corresponds to the phase position of the respective elemental area from which that cell is illuminated. Thus, assuming the areas to be equal and evenly spaced, the component signals from the five cells can, after passing through the respective elements 8, be represented by the five vectors 18a–e of FIGURE 3; the output signal from the photoelectric cell A is connected directly to terminal 17 and so this is not shifted in phase. The lengths of the vectors 18a–e correspond to the respective amplitudes from the cells for the particular fringe position shown in FIGURE 2. The component signals combine as represented in FIGURE 4 to produce an output signal represented by the vector 19 having a phase angle 22. The value of this phase angle is a measure of the position of the band of maximum illumination 21, illustrated by a dotted line in FIGURE 2, in terms of its distance from the centre of the elemental area associated with cell A. Movement of the fringe pattern across the frame of reference to the extent of one complete fringe cycle or interval will give rise to a rotation of the vector 19 through 360°. The resultant output signal is applied to a phase sensitive receiver 23 for producing an accurate indication or a faithful mechanical movement in correspondence with each instantaneous position of the fringe pattern, that is to say, of the reference grating 3 in relation to the index grating 4.

The use of separate lenses for concentrating the light from the illuminated areas of fringe pattern on to the photoelectric cells may be avoided by doing away with these lenses and increasing the size of each photoelectric cell to cover the apportioned area of window from which it receives light, the cells being placed preferably close to the pair of gratings. The pair of gratings producing the fringe pattern may operate on the vernier principle, or as crossed gratings having equal rulings, and the fringes may be normal to or inclined at an angle with the direction of measured fringe movement, according to the method used for suppression of spatial harmonics. A mask may be inserted in the light path between the light source and the photo cells with suitable apertures in it for the purpose of defining or narrowing the area of window seen by each cell, or there may be no mask so that substantially all the light from the illuminated fringe pattern falls on the photo cell, depending on the type of fringes used and the arrangements for suppression of spatial harmonics.

The number of photoelectric cells may be three, four or more, the number being decided in practice from considerations of elimination of spatial harmonics in the wave form of light intensity modulation due to movement of the fringe pattern. For example, an even number of photoelectric cells may be used, say six, and connected to two three-element networks acting in push-pull in order to balance out an even spatial harmonic. Alternatively an increased number of photoelectric cells may be used for the purpose of reducing the spatial harmonic content in the modulated combined output signals, because even if the alternating component of signal from each cell follows a pure sine wave, the wave form of amplitude modulation produced by the passage of fringes may depart considerably from a true sine wave and so introduce spatial harmonics. It is important for faithful reproduction of fringe movements into terms of phase angle changes of output signal that such spatial harmonics shall be reduced to a degree which is small compared with other possible sources of error in the system, and this can be greatly assisted by increasing the number of photoelectric cells each with its allotted area of fringe pattern. If several similarly distorted amplitude modulated signals are vectorially combined the harmonic content of the phase modulated resultant is reduced by a factor greater than the number of component signals.

For example, the maximum phase angle error in the combined resultant can, by increasing the number of component signals (that is to say photo-cells) to five, be reduced by a factor of about nine and this process can be carried further. Thus there is a further important advantage in addition to those mentioned above in that the method of combining the signals with the aid of such a simple type of network makes it possible to increase numbers of photo cells and their associated network elements without undue increase in cost.

Figure 3:
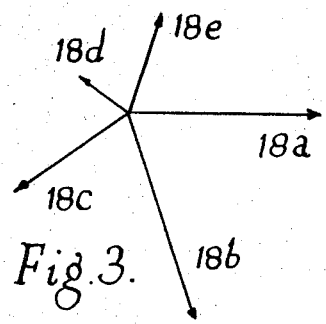
FIGURES 3 and 4 are explanatory diagrams referred to in the description of FIGURE 1.
Figure 4:
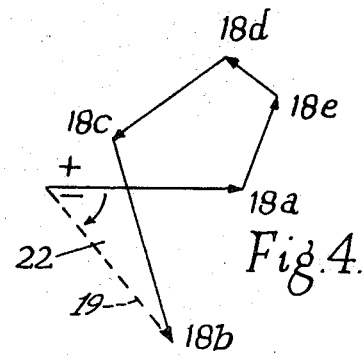

The phase-shift network will comprise elements suiting the number of separate signals from the photo cells, preferably one element for each photo cell, each element being adjusted to shift the phase of the signal applied to it through an angle such as to conform to a star-shaped vector diagram of the type illustrated in FIGURE 3 in which the angular relationship between the vectors corresponds to the positions in the spatial frame of reference of the areas of fringe pattern from which the signals are derived. For a single phase output one such network would be used, but if a polyphase output signal is required, say three-phase, the signals may be fed in parallel to three similar networks in which the phase shifts are suitably modified between one network and another to produce a balanced three-phase output. In general therefore the number of elements in each network will depend upon the number of photo cells used and the number of networks will depend on the number of output phases required.

As stated above it is desirable to minimise spatial harmonics in order to ensure that the fringe intensity characteristic conforms as closely as possible to a sine law. In the case of finely ruled gratings, i.e. those having say 1000 or more lines per inch, this is partly achieved by superimposing the gratings in close proximity with the gap between them adjusted in a known manner so as to combine most of the transmitted light into the zero and first order diffracted wave groups, then residual harmonics which will still exist may be reduced by increasing the number of cells and associated network elements as described above.

Figure 2:
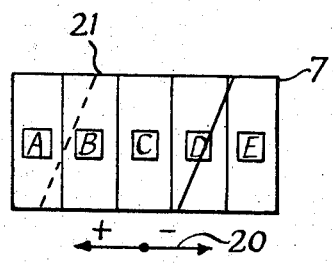
FIGURE 2 shows the disposition of the photoelectric cells with respect to the fringes.
Figure 5:
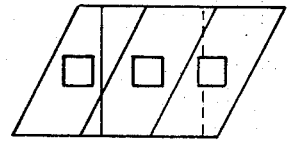
FIGURE 5 shows the disposition of the photoelectric cells with respect to the fringes in a modified arrangement using three photoelectric cells and fringes which lie normal to the direction of their movement.

There are important advantages however in using where possible coarsely ruled gratings, i.e. those having say 100 or less lines per inch, but the gap then has to be inconveniently large to obtain fringes by diffraction as mentioned above, so it is preferred to generate the fringes by the simple shutter effect. The result of this is that the spatial wave form i.e. the fringe intensity characteristic tends to become triangular giving rise to strong spatial harmonics. Measures therefore which will reduce these harmonics and their effect assume great importance, and this is achieved to a first degree in the invention described in my aforesaid Patent 3,230,380 in which the illuminated area of fringe pattern seen by each photo cell is rectangular and the fringes are inclined to be parallel with the diagonals of the rectangles. According to the present invention further substantial improvement is obtained as follows. Firstly a slotted mask is not used and the illuminated section of fringe pattern seen by the photoelectric cells is divided into three precisely equal four-sided areas, one for each photo cell, extending in a line parallel to the direction of measured fringe movement and covering exactly one complete fringe interval, and the inclination of the fringes is adjusted to be parallel with one diagonal of each of the four-sided areas, whether they form rectangles or parallelograms as shown in FIGURES 2 and 5. By this means the maximum spatial harmonic content of the fringe intensity characteristic in any part of its range can be reduced to less than 0.4%. Secondly by masking off, preferably at opposite corners, small areas on the diagonal parallel to the fringes totalling about 0.66% of the area of each of the three four-sided figures, the maximum content can be further reduced to less than 0.2%. Thirdly the total modulation harmonics in the combined output signal can be reduced still further to about 0.02% by comparing its phase, not with the light source supply, which would produce reduction by a factor of about four, but with one of the three photoelectric cell signals. This low order of harmonic content makes the error due to departure of the fringe intensity characteristic from a perfect sine wave negligible in proportion to other inevitable sources of error in any such system.

Alternatively an approximately sinusoidal fringe intensity characteristic can be obtained in a slightly simpler arrangement by positioning a collimator between light source 1 and gratings 3 and 4 and placing in the collimator a mask having circular apertures having a diameter equal to slightly over one third of the fringe pitch and so positioned that the light passing through each aperture falls on a respective cell.

In yet another arrangement, in order to obtain a sine law spatial waveform, one of the gratings may be produced photographically so as to form alternate opaque and transparent areas, the relative transparency of which varies sinusoidally along the length of the grating. Similarly in the case of a magnetic grating, the polarity of the system of recorded lines forming the grating may be arranged to follow a sine law.

Figure 6:
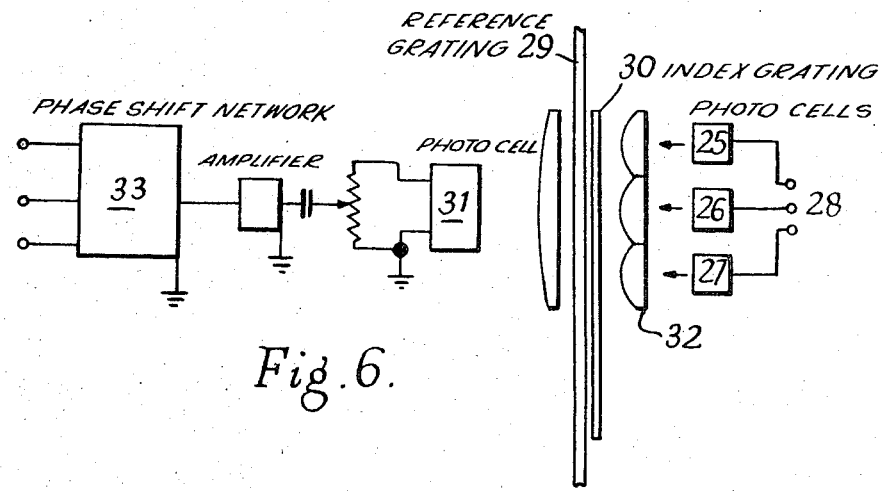
FIGURES 6, 7, 8 and 9 illustrate modified forms of apparatus in accordance with the invention.

The principle of the system described above may be applied in reverse, as it were, to the case in which there are a plurality of light sources energised from different phases of a polyphase supply, and a single photoelectric cell arranged to receive light from each of the light sources. Such an arrangement is illustrated in FIGURE 6, in which three light sources 25, 26 and 27 energised from a supply 28 are used to illuminate the two gratings 29, 30. A single photoelectric cell 31 responds to light passing through three elemental areas of the fringe pattern as defined by a collimating system including three collimating lenses 32. The output signal from the photoelectric cell 31 has three phase components whose respective amplitudes are proportional to the amount of light passing through the collimating lenses 32, and hence are dependent upon the position of the fringe pattern. The phase components are separated by a phase-shift network 33, to which the single phase composite signal from the cell 31 is applied, and from which a three phase output signal is derived, this output signal being displaced in phase relatively to the supply 28 by an angle proportional to the displacement of the fringe pattern. As in the preceding example, the elements of the phase-shift network are each adjusted to produce a phase shift corresponding to the phase position of the respective elemental area of the fringe pattern with respect to a fringe cycle.

Figure 7:
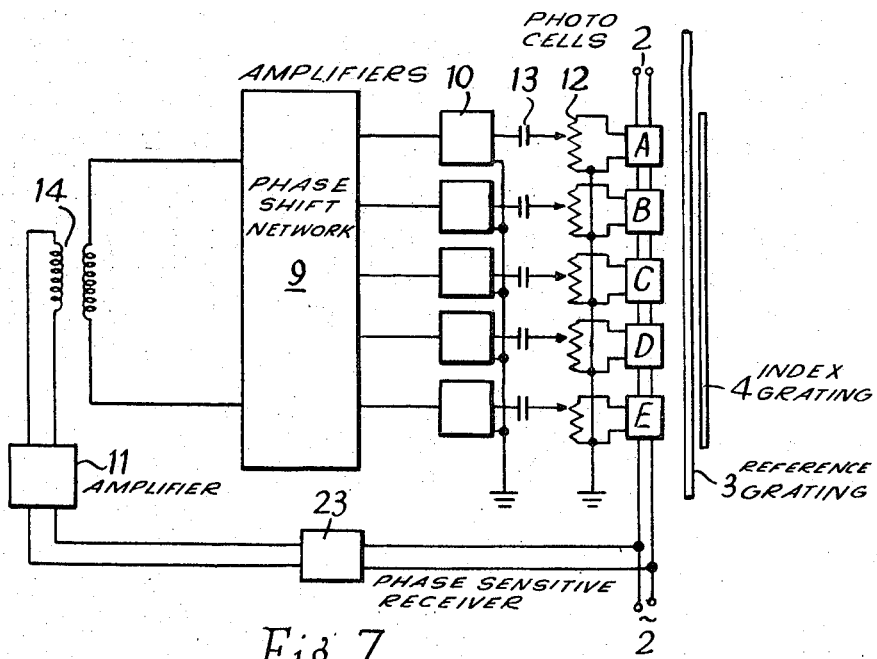

Another arrangement illustrating the use of magnetic fringes is illustrated in FIGURE 7. This arrangement corresponds very closely to the optical arrangement of FIGURE 1, but the photoelectric cells are replaced by magnetic flux gates or pick-ups A–E which are energised from a single phase 400 c./s. supply 2 and produce component output signals each in accordance with the magnetic flux of an elemental area of the fringe pattern. The arrangement operates in a manner exactly analogous to that of the optical arrangement of FIGURE 1, and other components of the system are numbered as in that arrangement.

In the above-mentioned patent applications the aspect of measuring the extent of relative movement by measuring an electrical phase angle is emphasised, and this aspect has been considered primarily in the above description. However, it will be appreciated that during any relative movement between the relatively movable members, and hence between the gratings, the frequency of the output signal of the arrangement will be displaced from its normal or reference frequency by an amount proportional to the speed of such relative movement. In other words, the normal output signal, which may be regarded as a carrier signal, will be frequency-modulated in accordance with the rate of passage of the fringes across the photoelectric cells. This modulation frequency may be used as an indication of the speed of relative movement and, in particular, may be used to produce a control signal for initiating a controlling operation in accordance with the movement. It is important of course that the supply frequency, or carrier frequency, should be much higher than the modulation frequency produced by the fringe movement in order to keep the frequency components of the output within a narrow band and so to enable the use of narrow band width amplifiers, and easy elimination of unwanted signals. For example, a modulation frequency of 500 c./s. is produced in the case of 1,000 lines per inch gratings moving relatively to one another at 30 inches per minute. In this case a carrier frequency of, say, 50 or 100 kc./s. results in signals of relatively narrow band width.

Figure 8:
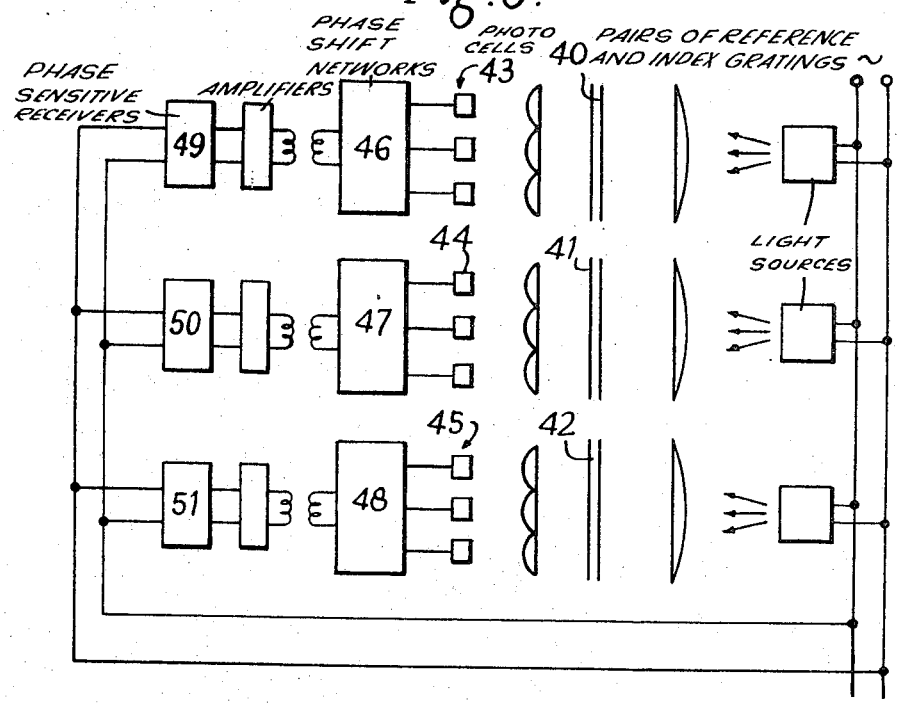

It is envisaged that the invention may be applied to the measurement of displacement over relatively large distances to a high order of accuracy using a number of pairs of gratings of different fineness. For example, in the arrangement illustrated in FIGURE 8 three pairs of gratings are used, namely a first pair 40 operating as diffraction gratings and producing interference fringes so that one fringe cycle corresponds to 1/10000 inch movement, and two pairs of gratings 41, 42 operating on the shutter principle and producing fringes in which one fringe cycle corresponds to 1/100 inch movement and 1 inch movement respectively. There is associated with each pair of gratings a separate system of photoelectric cells 43, 44, 45, the output signals from which being applied to a phase-shift network 46, 47 or 48 and then to a respective synchro type receiver motor 49, 50 or 51 or other phase sensitive receiver so as to produce a mechanical movement or other response corresponding to the phase angle rotation. The total displacement to be measured would be read from three scales, coarse, medium and fine, each giving an indication derived from one of the receivers.

Figure 9:
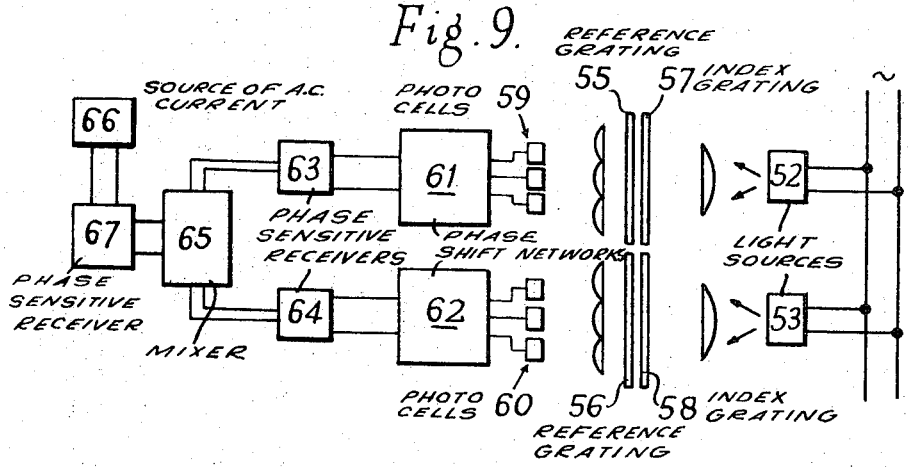

A further modification of the invention for the measurement of large displacements to a high order of accuracy, in which individual fringes corresponding to specified units of measurement are identified, will now be described with reference to FIGURE 9.

Light from a light source or sources 52, 53, fluctuating at say 100 kilocycles per second is arranged to pass through a system of gratings to produce interference fringes, the system comprising a reference pair of gratings 55, 56 mounted on the machine bed the first being ruled to for example 1000 lines per inch and the second to say 990 lines per inch. First and second index gratings 57, 58 ruled to for example 1001 and 991 lines per inch respectively are attached to the tool carriage and move with it in close proximity to the reference gratings. If the carriage moves at a speed of 30 inches per minute, fringes will pass across a reference point on the first index grating 57 at the rate of 500 per second and across the second index grating 58 at 495 per second, the fringe interval in each case being in this example one inch. Each system of fringes is detected by a set of photo-cells 59, 60 from which the output signals from each set are modulated at 500 c./s. and 495 c./s. respectively, having been applied to a phase-shift network 61, 62. The modulated signals produced by the first system are applied to a receiver 63 as previously described which will sense the instantaneous position of the tool carriage with reference to two predetermined positions corresponding to one line interval of the first reference grating, that is to say over a distance of .001 inch. The modulated signals produced by the second system are applied to a receiver 64 and indicate similarly the instantaneous position of the carriage over a distance corresponding to one line interval of the second reference grating. The difference between these two modulated sets of signals represents an indication of the instantaneous position of the tool carriage in terms of a distance corresponding to the reciprocal in inches of 1000–990, that is one tenth of an inch.

During movement of the tool carriage the two modulation frequencies of 500 and 495 c./s. will if combined in a mixer 65 produce a beat frequency of 5 c./s. which, after demodulation, can be compared with a standard or command signal of 5 c./s. from a standard source 66 so as to produce a resultant phase angle between the two. This angle as measured by a further receiver 67 is a measure of the position of the tool carriage relative to an instantaneous position called for by the command signal. The command signal may be derived from an oscillator or a tape recording operated to control the movements of the tool carriage. The same principle can be applied for measurement of the position of the tool carriage when stationary, since the signals from the two systems of gratings will have the same 100 kilocycles frequency as the light sources while their phase angles will indicate the position of the carriage. That is to say the phase angle relative to a phase of the light source supply of the signal from the first system will be a measure of position as a fraction of .001 inch. At the same time the relative phase angle between the signals from the first and second systems will indicate the position of the carriage as a fraction of 0.1 inch. Thus with the aid of two sets of rulings, which may for convenience be on a common strip of glass as a bi-partite reference grating, a difference signal can be obtained and applied to a phase sensitive receiver to extend the range of measurement by reducing the scale by a factor which in this example is 100. The same principles can be applied further, by the addition of further systems of gratings using still smaller differences in line interval as compared with the first reference grating to obtain further difference signals in relation to the first system of signals to extend the range of measurement to any desired extent using a suitable receiver for each system. To control a process such as a machining operation on a machine tool, suitable command signals containing beat frequency or phase difference information can be applied from a suitable source such as a set of recordings on a magnetic tape operated at a speed which is tied to the periodicity of the light source or sources, on which the process to be controlled is programmed and recorded.

In a variation of the invention adapted for the measurement of angular movement, a pair of coaxial circular gratings are attached to two relatively rotatable members whose angular relationship is to be measured. The gratings may be of disc form or in the form of concentric truncated cones and they may be ruled with radial or more or less skewed rulings, the one being ruled with slightly finer ruling than the other so as to produce a fringe pitch, by the vernier action, of say 1½ inches at the middle radius. One cycle of the fringe pitch is divided into three elemental areas each ½ inch wide, at the middle radius, and 1 inch wide radially. One set of rulings is skewed slightly more than the other in such a manner as to cause the fringes to lie in a direction such that a line of constant illumination intensity passes through opposite corners of each elemental area. A single collimated light source is arranged to illuminate the three areas susbtantially equally from one side of the pair of gratings, and the transmitted light after passing through the gratings is concentrated by three separate de-collimating lenses on to three photo-cells which are connected to three elements of a phase-shifting network in the manner already described, and the combined output signal from the network is compared in a phase-sensitive receiver with the signal from one of the photo-cells. Angular movement or position of one grating with respect to the other is then accurately sensed by the phase sensitive receiver to produce an indication or signal of the above relative angular movement to a high order of accuracy in terms of a fraction of the radial pitch of the rulings on whichever of the gratings is treated as the reference grating.

I claim:

1. Apparatus responsive to relative movement between two relatively movable members comprising a reference source providing an alternating current signal, a pair of gratings mounted respectively in fixed relation to said relatively movable members, said gratings being superposed in close proximity for producing a cyclic pattern of interference fringes in a flux field, means defining a plurality of elemental areas of the fringe pattern which areas are relatively displaced in phase with respect to the fringe pattern, detector means responsive to the fringes and positioned with respect to said areas for producing an alternating current signal having components each of whose amplitudes is a function of the flux across a respective elemental area of the fringe pattern, a phase shift network having input terminals and output terminals and including a number of phase-shifting elements corresponding to the number of said elemental areas, said input terminals being connected to the detector means and said output terminals being connected to an output circuit for deriving an output signal which is phase-displaced relatively to said reference signal by an amount proportional to the displacement of the fringes from a reference position, and means for comparing the output signal with the reference signal.

2. Apparatus according to claim 1, wherein the gratings are optical gratings illuminated by a plurality of light sources which are energised from different phases of a polyphase supply which also provides the reference signal, and wherein the detector means comprise a single photocell arranged to receive light from all said light sources.

3. Apparatus according to claim 1, wherein the reference source is a single phase supply, wherein the detector means comprise a number of individual detectors equal to the number of said areas and energised from the supply so as to produce in-phase signals whose respective amplitudes are functions of the fringe displacement from the reference position.

4. Apparatus according to claim 3, wherein the gratings are optical gratings illuminated by a light source energised from the single phase supply, and wherein the detectors are photoelectric cells.

5. Apparatus according to claim 3, wherein the gratings are magnetic gratings and the detector means comprise flux gates or pick-ups which are energised from the single phase supply.

6. Apparatus as claimed in claim 1 in which said means for comparing the phases of said output and reference signals is a phase-sensitive receiver whereby to determine the extent of relative movement between said members.

7. Apparatus as claimed in claim 1 in which said means for comparing the phases of said output signal and reference signal includes a frequency sensitive device for determining the frequency of said output signal whereby to determine the speed of relative movement between said members.

8. Apparatus as claimed in claim 1, wherein the area defining means defines each elemental area in the shape of a four-sided figure in order to conform the flux intensity characteristic of the fringe pattern along the direction of measured fringe movement closely to a sine law, the cyclical distance between the two opposite sides of said figure which define the extent of phase interval in the fringe pattern being one-third of the fringe interval, and the direction of lines of constant intensity in the fringe pattern lying closely parallel to a diagonal across each said elemental area.

9. Apparatus as claimed in claim 8, wherein the area defining means defines the area with the opposite sides of each said elemental area parallel.

10. Apparatus as claimed in claim 8, wherein, in the case of fringes formed between pairs of circular, conical or cylindrical gratings, the area defining means defines the area with the opposite sides of each said elemental area which define the phase limits of the cyclical pattern covered by said elemental area inclined to each other such that the phase limit defined by a side at the end phase-wise of one said elemental area is parallel with and corresponds to the phase limit defined by a side at the beginning phase-wise of the next said elemental area, and the inclination of the lines of constant intensity in the fringe pattern with respect to the said sides of said elemental areas is such that a line of constant intensity passing through one corner of an elemental area passes also exactly through the opposite corner of the same area.

11. Apparatus according to claim 8, in which the area defining means defines said elemental areas so that they are displaced in phase over more than one cycle of the fringe pattern and their phase positions in the fringe pattern when combined cover closely the equivalent of one complete fringe cycle.

12. Apparatus as claimed in claim 8, in which, in order to achieve still closer conformity of fringe intensity characteristic to a sine law, an area corresponding to a fraction of one percent of the total area of each of said elemental areas is masked to obscure or suppress the energy flux transiting said area at a point or points lying symmetrically on said diagonal.

13. Apparatus as claimed in claim 8, in which the number of elemental areas and their associated phase-shift network elements is more than three in order to improve the reduction of spatial harmonics in the combined output signal from the phase shifting network.

14. Apparatus as claimed in claim 8, in which said reference source is one of said detector means.

15. Apparatus as claimed in claim 8, in which the flux gratings are magnetic flux gratings for passing a fluctuating magnetic field.

References Cited

UNITED STATES PATENTS

| | | | |
|---|---|---|---|
| 3,096,441 | 7/1963 | Burkhardt | 250—209 |
| 3,114,046 | 12/1963 | Cabiniss et al. | 250—237 |
| 3,153,111 | 10/1964 | Barber et al. | 88—14 |
| 3,227,888 | 1/1966 | Shepherd et al. | 250—237 |
| 3,230,380 | 1/1966 | Cooke | 250—237 |

RALPH G. NILSON, *Primary Examiner.*

M. A. LEAVITT, *Assistant Examiner.*